United States Patent [19]

Muramatsu et al.

[11] Patent Number: 4,594,387

[45] Date of Patent: Jun. 10, 1986

[54] THERMOPLASTIC RESIN COMPOSITION HAVING TOUGHNESS AND HIGH THERMAL DEFORMATION RESISTANCE

[75] Inventors: Eiichi Muramatsu, Himeji; Sigemi Mathumoto, Takasago; Fumiya Nagoshi, Kobe, all of Japan

[73] Assignee: Kanegafuchi Kagaku Kogyo Kabushiki Kaisha, Osaka, Japan

[21] Appl. No.: 548,069

[22] Filed: Nov. 2, 1983

Related U.S. Application Data

[63] Continuation of Ser. No. 318,108, Nov. 4, 1981, abandoned.

[30] Foreign Application Priority Data

Nov. 11, 1980 [JP] Japan ................................. 55-159133

[51] Int. Cl.$^4$ ............................................. C08L 25/16
[52] U.S. Cl. ................................. 525/67; 525/80; 525/83; 525/87; 525/146
[58] Field of Search ................. 525/67, 80; 526/80, 526/87

[56] References Cited

U.S. PATENT DOCUMENTS

| | | | |
|---|---|---|---|
| 3,010,936 | 11/1961 | Irvin | 525/86 |
| 3,954,905 | 5/1976 | Margotte et al. | 525/67 |
| 4,294,946 | 10/1981 | Minematsu et al. | 526/80 |
| 4,361,684 | 11/1982 | Minematsu et al. | 526/87 |

FOREIGN PATENT DOCUMENTS 0078007  6/1980  Japan .................................. 526/80

*Primary Examiner*—Wilbert J. Briggs, Sr.
*Attorney, Agent, or Firm*—Armstrong, Nikaido, Marmelstein & Kubovcik

[57] ABSTRACT

A thermoplastic resin composition having toughness, high thermal deformation resistance, and good flowability which comprises a copolymer of α-methylstyrene and acrylonitrile, and/or vinyl monomer; a copolymer of diene olefin rubber grafted with methacrylic alkyl ester, vinyl aromatic compound, and/or vinyl cyanide; and polycarbonate.

4 Claims, No Drawings

THERMOPLASTIC RESIN COMPOSITION HAVING TOUGHNESS AND HIGH THERMAL DEFORMATION RESISTANCE

This is a continuation of application Ser. No. 318,108, filed Nov. 4, 1981, now abandoned.

BACKGROUND OF THE INVENTION

The present invention relates to a thermoplastic resin composition of α-methylstyrene-rich copolymer, vinyl graft copolymer, and polycarbonate, said composition being superior in thermal deformation resistance, impact resistance, and flowability in hot molding.

ABS resin (acrylonitrile-butadiene-styrene graft copolymer) has been in general use as an inexpensive material which is superior in mechanical properties and flowability in hot molding. However, ABS resin is not used in the areas where thermal deformation resistance higher than 90° C. is required. In addition, it is not used for making articles which require high impact resistance, toughness, and thermal deformation resistance.

On the other hand, polycarbonate has been used as a material which is superior in impact resistance, toughness, and thermal deformation resistance. However, it has drawbacks that the flowability in hot molding is poor, the price is high, and thick articles molded from it are brittle. Efforts have been made to remedy these drawbacks. For instance, there are shown the blending of ABS resin into polycarbonate in Japanese Patent Publication No. 15225/1963, the blending of styrene and methacrylate into a styrene-butadiene copolymer and the blending of a copolymer grafted with styrene, methyl methacrylate, and acrylonitrile into a styrene-butadiene copolymer in Japanese Patent Publication No. 71/1964, the blending of polystyrene in Japanese Patent Publication No. 6295/1968, and the blending of methyl methacrylate resin in Japanese Patent Publication No. 48500/1971. The compositions based on these known technologies, which are intended mainly to improve the flowability of polycarbonate in hot molding, do not necessarily possess preferable properties over a broad blending range. They lack either or both of mechanical strength (particularly impact strength and toughness) and thermal deformation resistance. Because of their unsatisfactory results, they are used only in limited areas.

There is disclosed in Japanese Patent Publication No. 504/1976 a technology for blending polycarbonate with a vinyl thermoplastic resin which is a mixture of a vinyl graft copolymer and a vinyl linear polymer consisting mainly of α-methylstyrene. The composition according to this known technology has comparatively good thermal deformation resistance and both high impact resistance and toughness. Nevertheless, it is necessary to increase the blend ratio of polycarbonate for specific application areas where a high level of thermal deformation resistance is required. This leads to high cost. In addition, it has been pointed out that such a blend composition suffers from a disadvantage. That is, if the content of α-methylstyrene in the vinyl linear polymer consisting mainly of α-methylstyrene is increased above the limit defined in the claim, the composition does not improve any longer in thermal resistance and mechanical properties but decomposes in molding.

SUMMARY OF THE INVENTION

It is an object of the present invention to provide a composition of (A) specific α-methylstyrene-rich copolymer, (B) vinyl graft copolymer, and (C) polycarbonate, which is free from the above-mentioned drawbacks of known technologies. The composition according to this invention has outstanding characteristics such as high thermal deformation resistance, high impact strength, toughness, absence of thermal decomposition in molding, and moderate price, even though the polycarbonate is blended in a limited range of quantities.

As regards the method for increasing the content of α-methylstyrene in the α-methylstyrene-containing copolymer, there are known technologies. Japanese Patent Publication No. 18194/1960 discloses blending of ABS resin and a copolymer consisting of α-methylstyrene and acrylonitrile. Japanese Patent Publication No. 33661/1970 discloses a technology in which α-methylstyrene 75 to 90 wt% and acrylonitrile 25 to 10 wt% are copolymerized in the first step, and α-methylstyrene remaining unreacted is reacted with a monomer mixture of styrene and acrylonitrile in the second stage. The former technology is disadvantageous in that the conversion of polymerization decreases rapidly when the quantity of α-methylstyrene exceeds 70 wt% in the monomer mixture in the polymerization system. The latter technology also has a drawback that the conversion of polymerization is low even when α-methylstyrene is used in the maximum quantity of 90 wt% and it is difficult to increase above 82 wt% the quantity of α-methylstyrene in the polymer produced in the first stage. Moreover, the more α-methylstyrene is used in the first stage, the more styrene and acrylonitrile are required to polymerize it in the second stage. Thus, the quantity of α-methylstyrene in the polymer is about 75 wt% at the maximum. This limits the improvement of thermal deformation resistance. Incidentally, there is poly-α-methylstyrene consisting of α-methylstyrene alone, but it has found a practical use only as a processing aid because of its too low a decomposition temperature.

According to the present invention intended to remedy the above-mentioned drawbacks, the specific α-methylstyrene-rich copolymer (A) is obtained by polymerizing in a special manner α-methylstyrene and acrylonitrile in a specific ratio. The material obtained by blending said α-methylstyrene-rich polymer (A), vinyl graft copolymer (B), and polycarbonate (C) has high thermal deformation resistance, high impact resistance, and toughness all together.

What is important in the present invention is the composition of the α-methylstyrene-rich copolymer. This copolymer consists of γ to 90 parts (by weight hereunder) of α-methylstyrene, 35 to 5 parts of acrylonitrile, and 0 to 30 parts of copolymerizable vinyl monomer. The copolymer (A) contains more than 30 parts of polymer chain containing more than 82% of α-methylstyrene, more preferably more than 10 parts of polymer chain containing more than 86% of α-methylstyrene. In the conventional technology, it was difficult to incorporate more than 30 parts of polymer chain containing more than 82% of α-methylstyrene and the thermal deformation temperature (under 18.6 kg load) was limited to 115° to 117° C. The copolymer (A) used in the composition of this invention has a thermal decomposition temperature higher than 117° C.

DETAILED DESCRIPTION OF THE PREFERRED EMBODIMENTS OF THE INVENTION

The aforesaid copolymer (A) is produced in the following manner. At first, α-methylstyrene monomer is charged and emulsified in the reactor. Acrylonitrile is added dropwise continuously little by little in such a rate that the weight ratio of α-methylstyrene monomer to acrylonitrile monomer is kept at 90/10, preferably 95/5, until the resulting polymer reaches 50 parts. By keeping α-methylstyrene in great excess, the object copolymer (A) can be obtained. The α-methylstyrene is charged in quantities from 65 parts to 90 parts. If the quantity is under 65 parts, satisfactory improvement over the conventional technology cannot be attained; and if the quantity is over 90 parts, the composition of this invention decreases in mechanical strength. The acrylonitrile monomer is added dropwise continuously in quantities from 5 parts to 35 parts. If the quantity is under 5 parts, the conversion of polymerization is low; and if the quantity is over 35 parts, the resulting composition is easy to discolor during processing and decreases in physical properties. The α-methylstyrene monomer to be charged at first may contain less than 10% (based on said monomer) of a vinyl cyanide compound and methacrylic lower-alkyl ester and acrylic lower-alkyl ester. The acrylonitrile monomer to be added dropwise continuously may contain less than 85% (based on said monomer) of a substituted or unsubstituted monovinyl aromatic compound and methacrylic lower-alkyl ester and acrylic lower-alkyl ester. The third component next to α-methylstyrene and acrylonitrile should be limited to less than 30 parts in order to avoid its adverse effect on heat resistance and impact resistance.

The vinyl graft copolymer (B) used for the composition of this invention is obtained by graft polymerization of at least one of vinyl cyanide compound, monovinyl aromatic compound, and methacrylic lower-alkyl ester (exemplified respectively by acrylonitrile, styrene, and methyl methacrylate) on conjugated diene rubber. The said graft copolymer (B) is composed of 35 to 80% of diene rubber and 65 to 20% of the mixture consisting of at least one of vinyl cyanide compound, monovinyl aromatic compound, and methacrylic lower-alkyl ester. The diene olefin rubber in the graft copolymer (B) includes polybutadiene, polyisoprene, and butadiene-styrene copolymer, but is not limited to them. The monovinyl aromatic compounds other than styrene include α-methylstyrene, chlorostyrene, and t-butylstyrene. The vinyl cyanide compounds other than acrylonitrile include methacrylonitrile. The methacrylic lower-alkyl esters other than methyl methacrylate include ethyl methacrylate and butyl methacrylate. In addition to the monomer to be grafted, any copolymerizable vinyl monomer may be used in an amount less than 5% based on the graft copolymer (B).

The aforesaid copolymer (A) and graft copolymer (B) are obtained by not only emulsion polymerization but also other processes. The emulsion polymerization can be accomplished by the usual manner. That is, the aforesaid monomer mixture is reacted in an aqueous medium in the presence of a free-radical initiator. Such free-radical initiators include water-soluble and oil-soluble peroxide compounds such as potassium persulfate, ammonium persulfate, cumene hydroperoxide, p-menthane hydroperoxide, azobis(2,4-dimethylvaleronitrile, and t-butyl peroxypivalate. In addition, such adjuvants as polymerization accelerator, polymerization controller, and emulsifier which are commonly used in emulsion polymerization may be used in the above-mentioned polymerization.

The polycarbonate (C) used for the composition of this invention is aromatic polycarbonate having aromatic groups on the main chain. The polycarbonate can be produced by either ester interchange process or phosgene process. Such polycarbonate is preferably derived from 2,2-(4,4'-dioxydiphenyl)propane, and may be blended with modified polycarbonate, co-carbonate, and polycarbonate of different molecular weight.

The composition of this invention comprising the copolymer (A), graft copolymer (B), and polycarbonate (C) varies in thermal deformation resistance, impact resistance, toughness, and flowability in hot molding depending on the composition and polymerization degree as well as their blending ratio. The preferable blending ratio is 30 to 60% of copolymer (A), 10 to 30% of graft copolymer (B), and 50 to 20% of polycarbonate. With the copolymer (A) less than 30%, the resulting composition is improved only a little in thermal deformation resistance and poor in flowability; and with the copolymer (A) more than 60%, the resulting composition is poor in impact resistance and toughness. With the graft copolymer (B) less than 10%, the resulting composition is poor in impact resistance and toughness; and with the graft copolymer (B) more than 30%, the resulting composition is poor in thermal deformation resistance and flowability. With the polycarbonate (C) less than 20%, the resulting composition is poor in impact resistance, toughness, and thermal deformation resistance; and with the polycarbonate (C) more than 50%, the resulting composition is poor in flowability and high in production cost.

Blending, pelletization, and molding for the composition of this invention may be accomplished by known processes. For instance, a mixture of the latexes of the copolymer (A) and graft copolymer (B) may be subjected to salting-out, followed by dehydration and drying. The resulting powder may be blended with powder or pellets of polycarbonate (C) and then mixed with heating using a roll mill, screw mixer, Banbury mixer, or kneader, followed by molding.

The polycarbonate (C) may be blended with the copolymer (A) or graft copolymer (B) in the form of latex or at the time of mixing. During blending, stabilizers, pigments, lubricants, fillers, etc. may be added as required. The additives and salting-out agent should be free from divalent metals in order to avoid decomposition and degradation during blending of polycarbonate.

The following examples illustrate the practice of this invention, but are not intended to limit its scope. Working examples and referential examples:

(1) Preparation of copolymer (A) (A1 to A7)
Into a reactor equipped with a stirrer were charged the following substances.

| | |
|---|---|
| Water | 250 parts |
| Sodium oleate | 3 parts |
| Sodium formaldehyde sulfoxylate | 0.4 part |
| Ferrous sulfate | 0.0025 part |
| Disodium ethylenediamine-tetraacetate | 0.01 part |

After removal of oxygen, the contents were heated to 60° C. with agitation under nitrogen stream and then monomers (I) shown in Table 1 were charged. After complete emulsification with agitation, monomers (II) shown in Table 1 were added dropwise continuously over 6 hours. Agitation was continued for additional 1 hour at 60° C. to complete polymerization. During polymerization, the latex was sampled from the reactor to analyze the composition and determine the conversion of polymerization. On completion of polymerization, the latex was coagulated with iron-free aluminum sulfate, followed by washing with water and drying. The resulting polymer was pelletized and subjected to measurement of thermal deformation resistance. The results are shown in Table 1.

TABLE 1

| Copolymer | Working Examples | | | | Referential Examples | | |
|---|---|---|---|---|---|---|---|
| | A1 | A2 | A3 | A4 | A5 | A6 | A7 |
| Monomer (I) | | | | | | | |
| α-MS (parts) | 80 | 70 | 70 | 75 | 0 | 0 | 70 |
| AN (parts) | 0 | 0 | 5 | 0 | 0 | 0 | 20 |
| t-DM (parts) | 0.2 | 0.2 | 0.2 | 0.2 | 0 | 0 | 0.2 |
| Monomer (II) | | | | | | | |
| AN (parts) | 20 | 30 | 22 | 22 | 20 | 30 | 8.5 |
| α-MS (parts) | 0 | 0 | 3 | 0 | 80 | 70 | 1.5 |
| MMA (parts) | 0 | 0 | 0 | 3 | 0 | 0 | 0 |
| CHPO (parts) | 0.5 | 0.5 | 0.5 | 0.5 | 0.5 | 0.5 | 0.5 |
| t-DM (parts) | 0.2 | 0.2 | 0.2 | 0.2 | 0.4 | 0.4 | 0.2 |
| Content of α-methylstyrene at 50% conversion of polymerization (%)* | 83 | 82 | 82 | 82 | 70 | 68 | 69 |
| Final conversion of polymerization (%) | 96 | 97 | 96 | 97 | 88 | 96 | 96 |
| Thermal deformation resistance (°C.)** | 119 | 117 | 118 | 118 | 109 | 108 | 109 |

Remarks:
α-MS = α-methylstyrene
AN = acrylonitrile
MMA = methyl methacrylate
t-DM = t-dodecylmercaptan
CHPO = cumene hydroperoxide
Note:
*The content of α-methylstyrene in the copolymer which was calculated by the elemental analysis of the copolymer.
**Load 18.6 kg in accordance with ASTM D648-56

As Table 1 indicates, the copolymer obtained according to the polymerization method of this invention is superior in thermal deformation resistance to the copolymer obtained by the known polymerization method. The copolymers of α-methylstyrene and acrylonitrile (identified as A5 to A7 in referential examples) obtained by the conventional technology are limited in the thermal deformation temperature because they consist mainly of alternating copolymer of α-methylstyrene and acrylonitrile. In contrast to this, the copolymers of this invention (identified as A1 to A4 in working examples) exhibit high thermal deformation temperature which could not been obtained in the past because they contain polymer chains containing more than 82% of α-methylstyrene.

(2) Preparation of graft copolymer (B)
Into a reactor equipped with a stirrer were charged the following substances.

| | |
|---|---|
| Water | 250 parts |
| Sodium formaldehyde sulfoxylate | 0.2 part |
| Ferrous sulfate | 0.0025 part |
| Disodium ethylenediamine-tetraacetate | 0.01 part |
| Polybutadiene (solids) | 60 parts |

After removal of oxygen, the contents were heated to 60° C. with agitation under nitrogen stream and then monomers (III) shown in Table 2 were added dropwise continuously over 5 hours. Agitation was continued for additional 1 hour at 60° C. to complete polymerization.

TABLE 2

| Monomers (III) | MS | AS |
|---|---|---|
| AN (parts) | 0 | 12 |
| ST (parts) | 12 | 28 |
| MMA (parts) | 28 | 0 |
| CHPO (parts) | 0.3 | 0.3 |

Remarks:
ST = styrene
AN = acrylonitrile
MMA = methyl methacrylate
CHPO = cumene hydroperoxide (3) Preparation of thermoplastic resin compositions
The copolymer (A) and graft copolymer (B) prepared in the above steps (1) and (2) were mixed at a specific ratio in the form of latex. After addition of an antioxidant, the latex mixture was coagulated with iron-free aluminum sulfate, followed by washing, filtration, and drying. The resulting powder was blended with polycarbonate, "Panlite" K-1400W, K-1300W, and L-1250 (made by Teijin Kasei) and the mixture was pelletized for measurement of physical properties. The results are shown in Table 3.

As Table 3 indicates, the compositions of this invention (Working examples 1 to 9) are superior in thermal deformation resistance to the conventional copolymer (Referential examples 1 to 9). They also have high impact resistance at room temperature and low temperatures and high toughness. In addition, they are more flowable and less expensive than polycarbonate.

Tensile strength was measured in accordance with ASTM D-636; Izod impact strength, ASTM D-256 (⅛ inch thick with notch at 30° C.; and thermal deformation temperature, ASTM 648-56 (load 18.6 kg). Falling weight impact strength is expressed to multiply the weight of dart by the height from which a 4-kg weight is dropped to break half the samples (100×150×3 mm) tested at room temperature. The flowability was measured on a "Koka type" flow tester with 100 kg load at 260° C.

TABLE 3

| | Working Examples | | | | | | | | | Referential Examples | | | | | | | | | Unit: parts |
|---|---|---|---|---|---|---|---|---|---|---|---|---|---|---|---|---|---|---|---|
| Items | 1 | 2 | 3 | 4 | 5 | 6 | 7 | 8 | 9 | 1 | 2 | 3 | 4 | 5 | 6 | 7 | 8 | 9 | |
| Copolymer (A) | | | | | | | | | | | | | | | | | | | |
| A-1 | 42 | | | | 42 | 42 | 42 | 50 | 35 | | | | 63 | 21 | | 70 | 70 | | |
| A-2 | | 42 | | | | | | | | | | | | | | | | | |
| A-3 | | | 42 | | | | | | | | | | | | | | | | |
| A-4 | | | | 42 | | | | | | | | | | | | | | | |
| A-5 | | | | | | | | | | 42 | | | | | | | | | |
| A-6 | | | | | | | | | | | 42 | | | | | | | | |

TABLE 3-continued

| Items | Working Examples | | | | | | | | | Referential Examples | | | | | | | | | Unit: parts |
|---|---|---|---|---|---|---|---|---|---|---|---|---|---|---|---|---|---|---|---|
| | 1 | 2 | 3 | 4 | 5 | 6 | 7 | 8 | 9 | 1 | 2 | 3 | 4 | 5 | 6 | 7 | 8 | 9 | |
| A-7 | | | | | | | | | | | | 42 | | | | | | | |
| Copolymer (B) | | | | | | | | | | | | | | | | | | | |
| M S | | | | | 18 | | | 20 | 25 | | | | | | | | | | |
| A S | 18 | 18 | 18 | 18 | | 18 | 18 | | | 18 | 18 | 18 | 27 | 9 | 60 | | 30 | | |
| Polycarbonate (C) | | | | | | | | | | | | | | | | | | | |
| Panlite K-1400 W | | | | | | 40 | | | | | | | | | | | | | |
| Panlite K-1300 W | 40 | 40 | 40 | 40 | 40 | | | 30 | 40 | 40 | 40 | 40 | 10 | 70 | 40 | 30 | | 100 | |
| Panlite K-1250 W | | | | | | | 40 | | | | | | | | | | | | |
| Physical properties | | | | | | | | | | | | | | | | | | | |
| Tensile strength (kg/cm$^2$) | 540 | 550 | 551 | 540 | 552 | 553 | 551 | 532 | 487 | 521 | 560 | 554 | 501 | 625 | 292 | 695 | 529 | 700 | |
| Izod impact strength (kg-cm/cm$^2$) | 20.2 | 25.2 | 26.5 | 28.2 | 26.8 | 35.8 | 11.5 | 11.0 | 39.2 | 20.2 | 21.2 | 22.5 | 11.1 | 55.8 | 13.0 | 2.9 | 15.1 | 35.2 | |
| Falling weight impact strength (kg-m) | 8.9 | 9.5 | 9.2 | 9.0 | 9.5 | 10.4 | 9.1 | 7.8 | 10.9 | 8.8 | 9.2 | 9.3 | 4.1 | 11.5 | 3.5 | 1.5 | 4.0 | — | |
| Thermal deformation temperature (°C.) | 123 | 120 | 120 | 120 | 121 | 121 | 119 | 117 | 115 | 114 | 112 | 113 | 113 | 121 | 99 | 122 | 114 | 135 | |
| Flowability (10$^{-2}$ cc/sec) | 4.2 | 6.2 | 6.0 | 5.9 | 3.6 | 3.8 | 6.8 | 4.8 | 3.0 | 4.6 | 6.5 | 6.2 | 4.1 | 1.5 | 3.0 | 18.1 | 4.9 | <0.2 | |

What is claimed is:

1. A thermoplastic resin composition having toughness and high thermal deformation resistance which comprises 30 to 60 wt% of an α-methylstyrene-rich copolymer (A), 10 to 30 wt% of a vinyl graft copolymer (B), and 50 to 20 wt% of a polycarbonate (C), said copolymer (A) consisting of 65 to 90 parts by weight of α-methylstyrene and 35 to 5 parts by weight of acrylonitrile and 0 to 30 parts by weight of copolymerizable vinyl monomer, 30 parts by weight or more of said copolymer (A), based on copolymer (A), having polymer chain units with an α-methylstyrene content of 82% by weight or more based on the total amount of α-methylstyrene and other polymerizable monomers in the 30 parts by weight or more of said copolymer (A), and said graft copolymer (B) being one which is obtained by grafting at least one member of methacrylic alkyl ester, vinyl aromatic compound, and vinyl cyanide compound onto diene olefin rubber.

2. A composition as claimed in claim 1, wherein the α-methylstyrene-rich copolymer (A) is prepared by the following steps:

charging 65 parts by weight or more of α-methylstyrene and 10% by weight or less, based on the α-methylstyrene, of acrylonitrile and/or copolymerizable vinyl monomer into the reactor all at once, emulsifying the reactants, and emulsion polymerizing the emulsified monomers, in the presence of a redox initiator, while gradually adding at least 5 and up to 35 parts by weight of acrylonitrile and 85% or less, based on the acrylonitrile, of copolymerizable vinyl monomer, wherein the weight ratio of α-methylstyrene to monomers other than α-methylstyrene in the reaction system is maintained at 90/10 or higher until the resultant polymer reaches 50 parts by weight based on 100 parts by weight monomers charged.

3. A thermoplastic resin composition having toughness and high thermal deformation resistance which comprises 30 to 60 wt% of an α-methylstyrene-rich copolymer (A), 10 to 30 wt% of a vinyl graft copolymer (B), and 50 to 20 wt% of a polycarbonate (C), said copolymer (A) consisting of 65 to 90 parts by weight of α-methylstyrene and 35 to 5 parts by weight of acrylonitrile and 0 to 30 parts by weight of copolymerizable vinyl monomer, 30 parts by weight or more of said copolymer (A), based on copolymer (A), having polymer chain units with an α-methylstyrene content of 82% by weight or more based on the total amount of α-methylstyrene and other polymerizable monomers in the 30 parts by weight or more of said copolymer (A), and said graft copolymer (B) being one which is obtained by grafting at least one member of methacrylic alkyl ester, vinyl aromatic compound, and vinyl cyanide compound onto diene olefin rubber, wherein the α-methylstyrene-rich copolymer (A) is prepared by the following steps:

charging 65 parts by weight or more of α-methylstyrene and 10% by weight or less, based on the α-methylstyrene, of acrylonitrile and/or copolymerizable vinyl monomer into the reactor all at once, emulsifying the reactants, and emulsion polymerizing the emulsified monomers, in the presence of a redox initiator, while gradually adding at least 5 and up to 35 parts by weight of acrylonitrile and 85% or less, based on the acrylonitrile, of copolymerizable vinyl monomer, wherein the weight ratio of α-methylstyrene to monomers other than α-methylstyrene in the reaction system is maintained at 90/10 or higher until the resultant polymer reaches 50% conversion, and continuing the polymerizing.

4. A thermoplastic resin composition having toughness and high thermal deformation resistance which comprises 30 to 60 wt% of an α-methylstyrene-rich copolymer (A), 10 to 30 wt% of a vinyl graft copolymer (B), and 50 to 20 wt% of a polycarbonate (C), said copolymer (A) consisting of 65 to 90 parts by weight of α-methylstyrene and 35 to 5 parts by weight of acrylonitrile and 0 to 30 parts by weight of copolymerizable vinyl monomer, 30 parts by weight or more of said copolymer (A), based on copolymer (A), having polymer chain units with an α-methylstyrene content of 82% by weight or more based on the total amount of α-methylstyrene and other polymerizable monomers in the 30 parts by weight or more of said copolymer (A), and said graft copolymer (B) being one which is obtained by grafting at least one member of methacrylic alkyl ester, vinyl aromatic compound, and vinyl cyanide compound onto diene olefin rubber, wherein the α-methylstyrene-rich copolymer (A) is prepared by the following steps:

charging 65 parts by weight or more of α-methylstyrene and 10% by weight or less, based on the α-methylstyrene, of acrylonitrile and/or copolymerizable vinyl monomer into the reactor all at once, emulsifying the reactants, and emulsion polymerizing the emulsified monomers, in the presence of a redox initiator, while gradually adding at least 5 and up to 35 parts by weight and acrylonitrile of 85% or less, based on the acrylonitrile, of copolymerizable vinyl monomer, wherein the weight ratio of α-methylstyrene to monomers other than α-methylstyrene in the reaction system is maintained at 90/10 or higher for a time sufficient so that the resultant α-methylstyrene-rich copolymer (A) will contain the 30 parts by weight or more of polymer chain units with an α-methylstyrene content of 82% by weight or more, based upon the total amount of α-methylstyrene and other polymerizable monomers in the 30 parts by weight or more of the α-methylstyrene-rich copolymer (A).

* * * * *